(12) United States Patent
Ludwigsen et al.

(10) Patent No.: US 11,853,357 B2
(45) Date of Patent: *Dec. 26, 2023

(54) METHOD AND SYSTEM FOR DYNAMICALLY ANALYZING, MODIFYING, AND DISTRIBUTING DIGITAL IMAGES AND VIDEO

(71) Applicant: Pandoodle Corporation, Lexington, SC (US)

(72) Inventors: David M Ludwigsen, Columbia, SC (US); Dirk Dewar Brown, Lexington, SC (US); Mark Bradshaw, Weston, FL (US)

(73) Assignee: PANDOODLE CORPORATION, Lexington, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,159

(22) Filed: Nov. 22, 2021

(65) Prior Publication Data

US 2022/0083784 A1 Mar. 17, 2022

Related U.S. Application Data

(63) Continuation of application No. 16/560,298, filed on Sep. 4, 2019, now Pat. No. 11,182,618.

(Continued)

(51) Int. Cl.
*G06V 20/40* (2022.01)
*G06F 16/783* (2019.01)
(Continued)

(52) U.S. Cl.
CPC ...... *G06F 16/7837* (2019.01); *G06F 18/2137* (2023.01); *G06T 3/0093* (2013.01);
(Continued)

(58) Field of Classification Search
USPC .......................................... 382/103
See application file for complete search history.

(56) References Cited

U.S. PATENT DOCUMENTS 9,514,381 B1 * 12/2016 Ludwigsen .......... G06V 10/255
10,026,228 B2 * 7/2018 Yuen ....................... G06T 17/10
(Continued)

OTHER PUBLICATIONS

Zhang et al., An Automatic Three-Dimensional Scene Reconstruction System Using Crowdsourced Geo-Tagged Videos, Sep. 2015, IEEE 0278-0046, vol. 62, No. 9, pp. 5738-5746. (Year: 2015).*

*Primary Examiner* — Ishrat I Sherali
(74) *Attorney, Agent, or Firm* — LAW OFFICES OF ALBERT WAI-KIT CHAN PLLC

(57) ABSTRACT

The present invention discloses a new method for analyzing, modifying, and distributing digital images and video in a quick, efficient, practical and/or cost-effective way. The method of processing video can take a different region or object and replace the pixels in the frames of the scenes that comprise the features and characteristics of the identified region or object with a different set of pixels. The replacement or other customizations of the frames and scenes lead to a naturally integrated video or image which is indistinguishable by the human eye or other visual system. In one embodiment, this invention can be used to provide different advertising elements into an image or set of images for different viewers, or to enable a viewer to control elements within a video and add their own preference or other elements.

20 Claims, 6 Drawing Sheets

Related U.S. Application Data

(60) Provisional application No. 62/726,764, filed on Sep. 4, 2018.

(51) Int. Cl.
| | |
|---|---|
| *G06T 3/00* | (2006.01) |
| *G06T 3/60* | (2006.01) |
| *G06T 5/00* | (2006.01) |
| *G11B 27/036* | (2006.01) |
| *H04N 5/272* | (2006.01) |
| *H04N 21/234* | (2011.01) |
| *H04N 21/81* | (2011.01) |
| *G06F 18/2137* | (2023.01) |
| *G06V 10/20* | (2022.01) |

(52) U.S. Cl.
CPC ............... *G06T 3/60* (2013.01); *G06T 5/002* (2013.01); *G06V 10/255* (2022.01); *G06V 20/46* (2022.01); *G11B 27/036* (2013.01); *H04N 5/2723* (2013.01); *H04N 21/23424* (2013.01); *H04N 21/812* (2013.01); *G06T 2207/10016* (2013.01)

(56) References Cited

U.S. PATENT DOCUMENTS

| | | | |
|---|---|---|---|
| 11,182,618 B2 * | 11/2021 | Ludwigsen | G11B 27/036 |
| 11,182,954 B2 * | 11/2021 | Haramaty | G06T 15/08 |
| 11,605,227 B2 * | 3/2023 | Ludwigsen | G06T 5/002 |
| 2006/0251177 A1 * | 11/2006 | Webb | H04N 19/895 |
| | | | 375/240.18 |
| 2017/0161558 A1 * | 6/2017 | Ludwigsen | G06T 11/60 |
| 2020/0082611 A1 * | 3/2020 | Haramaty | G06T 15/08 |
| 2020/0242367 A1 * | 7/2020 | Ludwigsen | G06F 16/7837 |
| 2021/0201955 A1 * | 7/2021 | Ludwigsen | G06T 3/0093 |

* cited by examiner

METHOD AND SYSTEM FOR DYNAMICALLY ANALYZING, MODIFYING, AND DISTRIBUTING DIGITAL IMAGES AND VIDEO

CROSS-REFERENCE TO RELATED APPLICATIONS

This application is a Continuation application of U.S. Ser. No. 16/560,298, filed Sep. 4, 2019, which claims the benefit of U.S. Ser. No. 62/726,764, filed Sep. 4, 2018. The entire contents and disclosures of the preceding applications are incorporated by reference into this application.

BACKGROUND OF THE INVENTION

In a typical video, there are a variety of ways to identify certain scenes, regions, objects and features by the human eye. It is more difficult to identify and track these same scenes, regions, objects and features in an automated fashion as there are multiple characteristics that need to be observed, identified, and tracked. By identifying a scene, region or an object, and all of the associated characteristics of that particular scene, region or object, however, one can take a different region or object and replace the actual pixels in all frames of all scenes that comprise all of the features and characters of the identified region or object with a different set of pixels that look like they belong in the original frames and scenes such that they are indistinguishable by the human eye or other visual system. This might be used, for example, to provide different advertising elements into an image or set of images for different viewers, or to enable a viewer to control elements within the video and add their own preference or other elements.

BRIEF SUMMARY OF THE INVENTION

In one embodiment, the method for processing a video in this invention is characterized by:
  (i) Identifying one or more elements in each frame of said video;
  (ii) Identifying one or more scenes from said video by comparing the elements in each frame with the elements in the previous frame and subsequent frame, wherein frames having common elements above a threshold number will be considered to be in the same scene;
  iii) Obtaining one or more associated characteristics for each element in each frame;
  iv) Generating a map on the 3D environment in each frame based on the associated characteristics in one or more previous frames and one or more subsequent frames; and
  v) Modifying one or more scenes in said video based on said map.

In one embodiment, the method disclosed in this invention is further characterized in that the element in step (i) is an object or a selected area in a scene of said video, the one or more elements in step (i) are identified by comparing with the characteristics stored in an object database; wherein said element is automatically detected by a detection algorithm which is stored in a detection algorithm database, or selected by user's input.

In one embodiment, the method disclosed in this invention further comprises the step (ii) in which the two or more said scenes are correlated by the elements in each of said scenes and stored in a scene database.

In one embodiment, the associated characteristics in step (iii) include, but are not limited to, position, dimension, reflection, lighting, shadows, warping, rotation, blurring and occlusion.

In one embodiment, the step (v) comprises modifying the one or more scenes by removing one or more elements and applying the map generated in the step (iv) to average the one or more removed elements in each frame within one or more scenes.

In one embodiment, the step (v) comprises modifying said one or more scenes by warping a desired element and applying the map generated in the step (iv) over the desired element in each frame within one or more scenes.

In one embodiment, the method disclosed in this invention further comprises delivering the modified video of step (v) by streaming or downloading.

In one embodiment, the present invention provides a method for analyzing, modifying, and distributing digital images or video in a quick, efficient, practical and/or cost-effective way. In one embodiment, the invention breaks video into scenes and frames, which can be separately and in-parallel pre-processed and then correlated with each other by establishing relationships among the identified objects, areas, frames, scenes and their associated metadata. In another embodiment, the system and the method is configured to identify scenes and correlate them during the video. As another embodiment, objects, areas or part of an object or area together with some of their characteristics such as, for example, lighting, shadows, and/or occlusion are employed to calculate a set of algorithms for each pixel, which can be applied for rapid replacement or removal in a customized manner. In a further embodiment, elements-identification algorithms are used to identify the elements within each frame and determine how they are related with each other. The algorithms for identifying objects, area or other elements, include, but are not limited to, DRIFT, KAZE, SIFT (Scale-invariant Feature Transform), SURF (Speeded Up Robust Features), haar classifiers, and FLANN (Fast Library for Approximate Nearest Neighbors). In a further embodiment, the object and area in different frames determined to belong to the same scene will be stored in a scene database, which can be further used for subsequent identifications. The scene database can specify how scenes are related to one another and store all the information in each scene. In another embodiment, a scene processing server is used to intelligently pass scenes to scene worker nodes, in which scenes can be processed in groupings for fast processing. In some embodiments, the characteristics determined in the overall frame can be used to create different types of maps and generate an overall object map. An identification database can be created to store all the information for high speed detection of objects in original video and fast replacement for customized video. In some embodiments, the identification database as above is further categorized into 'subsets', which allows quickly processing a single frame containing millions of objects against a number of nodes in order to play back the customized video at the near speed of standard buffering and playback. Another aspect of the invention involves algorithms for gathering and training images datasets which can be used for scene preprocessing, frame preprocessing, and replacement or removal phase. The algorithms include, but are not limited to, PICO, haar classifiers, and supervised learning. Another aspect of the invention involves creation of a 3d spatial map of each frame consisting of all the objects, areas, light sources, shadows, occluded objects, and context. Another aspect of the invention allows users to select object or area to be replaced or removed. Another aspect of the invention involves high speed, distributed replacement of objects or areas in n number of frames, by which the alternation process can be near real-time. Another aspect of the invention allows to pre-download the video with insertion of replacement items, which is preferable when no customized insertion is needed but low server loads and cost are required. As for another embodiment, a video can be segmented into 1+number of replaceable element parts, by which the video can retain n number of un-customized portions and only need to encode the customized portion.

BRIEF DESCRIPTION OF THE DRAWINGS

Various embodiments of the invention are disclosed in the following detailed description and the accompanying drawings.

DETAILED DESCRIPTION OF THE INVENTION

Figure 1:
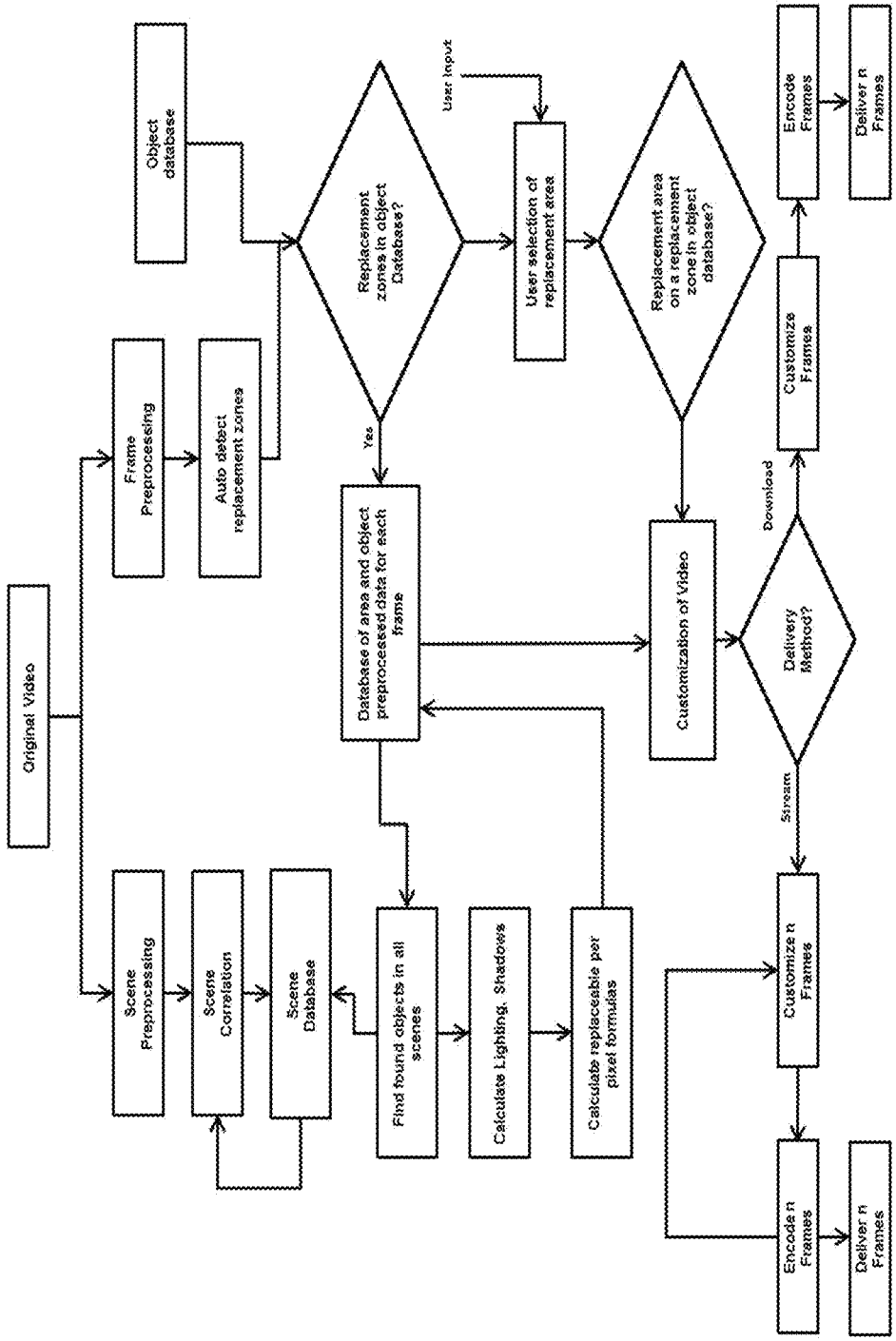
FIG. 1 is a flowchart illustrating one way in which the current invention can be used to identify scenes, objects, and areas in order to subsequently replace objects and areas in all scenes in which that object and area are found.

The invention can be implemented in numerous ways, including as a process; an apparatus; a system; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough 'understanding' of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present invention relates to a system and method in which a video may be broken down into scenes that may relate to each other and objects and areas that exist across a single or multiple scenes. By doing this, the invention allows a user to 'understand' the context of a video or the video may be able to quickly, efficiently, realistically, and/or inexpensively be customized by pre-processing the identified scenes and frames of the video with the identified objects and areas and other types of metadata associated with an object or area or with the scene itself. These elements can then be replaced, altered, or removed.

In some embodiments of the present invention, a system and method for identifying and tracking scenes, objects, or all or a portion of an area in a video is described. In some embodiments, the method is configured to identify scenes that relate to each other during the video. In some embodiments, in each related scene, objects or part of an object or areas or part of an area are identified along with associated characteristics such as lighting, shadows, occlusion, and are used to calculate a set of algorithms for each pixel in each object or area that can be applied for rapid replacement of all pixels in each object or area and its associated characteristics. In some embodiments, the method is used to allow a user or machine to replace the identified object or area in each scene in the video with a logo, object, or replacement image such that the resultant logo, object, or replacement image would appear to have been there all along. In some embodiments, the method is used to allow a user or machine to remove the object or area such that it would appear to have never been there at all. In some embodiments, the method is used to reconstruct 3d spatial maps for each frame.

FIG. 1 shows a flowchart illustrating a system to capture scene, object, area, and other related metadata related to a video and use that information to generate object and area maps and to then subsequently customize and distribute the video. Referring to FIG. 1, the system starts by analyzing the original video which contains naturally occurring elements that were captured during the original shooting of the video. In one embodiment of the invention, the scenes and frames can be analyzed in parallel. Once both scenes and frames are analyzed, and all information is preprocessed, the invention can provide metadata around the context of the video and can provide optimal suggested replacement zones to a user or other computer program. Once a replacement zone is chosen for replacement or removal or alteration, the object or area can be altered quickly due to the preprocessed information and can be either sent by individual altered frames to a different processing mechanism for buffering or streaming, or can be queued until all customized frames have completed processing and sent to a different processing mechanism such as encoding.

In some embodiments of the present invention, a system and method for analyzing and correlating scenes are described. A scene is categorized as one or more frames in a video that are related in some way. Frames in a video are analyzed in a scene preprocessing stage in which element-identification algorithms are used to identify elements within each frame of the video to determine which frames are associated with each other. The algorithms identify objects, like-pixel areas, sequences of continuous action, lighting, locations, and other elements that can be compared from frame to frame. As an example, a car chase sequence may be identified by identifying two cars and the characteristics of each car (color, type, branding), the drivers of each car, the surrounding location of where the cars are driven, and other identifiable elements in continuous frames and assign a weight to each identifiable object, area, or characteristic in order to compare it to a previous or subsequent frame. In a different example, a bedroom location may be automatically detected by identifying furniture and the associated characteristics of each (e.g., color, type, branding, scratches), and other elements such as artwork on the wall, carpeting, doors, etc. These objects or areas can be identified by a variety of algorithms including, but not limited to, DRIFT, KAZE, SIFT (Scale-invariant Feature Transform), SURF (Speeded Up Robust Features), haar classifiers, and FLANN (Fast Library for Approximate Nearest Neighbors). When the number of common elements that have been identified between two sequential frames, or groups of frames, decreases past a threshold number, then the scene is considered to have changed. In a normal sequential scene change, the number of common elements will drop from a large number within a scene to zero for the next scene. When fading from one scene to another or gradual shifts in scene changes, groups of frames can be used to determine the transition point from one frame to another. For example, in the case where a scene starts to fade into another scene, the element-identification algorithms begin to identify fewer common elements in sequential frames and pick up an increasing number of common elements in a new set of frames for the next scene. The transition point between scenes can be determined in a number of ways, including the midpoint of the faded transition, as determined by the frame number halfway between the last frame of the first scene in which the maximum number of common elements can be identified and the first frame of the second scene in which the maximum number of common elements can be identified. The transition point in fading from one scene to another can also be defined differently for different elements in the scene depending on when that element first fades in or fades out.

Figure 2:
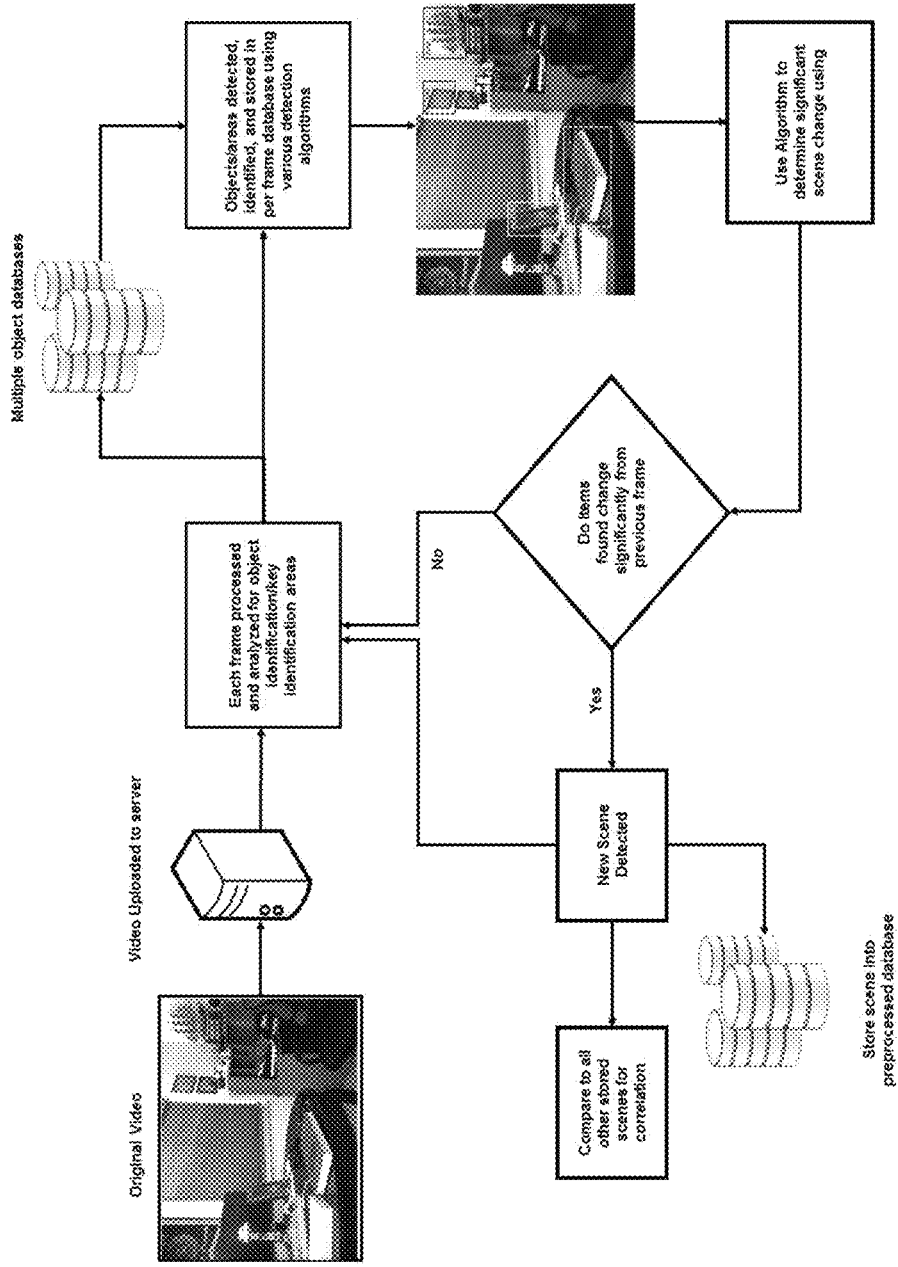
FIG. 2 illustrates how a scene can be preprocessed and how multiple scenes can be correlated based on similar characteristics.

Once the object and area comparisons in a previous or subsequent frame have determined that the current frame belongs to a different scene, the previous scene and all of its characteristics can be stored in a database, as shown in FIG. 2. This can be used to later identify related scenes that have the same characteristics through scene correlation by comparing to other non-sequential scenes whose data has already been stored. As an example, Scene 1 may be found to be unrelated to Scene 2, but Scene 1 could be related to Scene 3 based on the same types of comparisons that determined that Scene 1 and Scene 2 are unrelated and that frames within Scene 1 are related. By doing this, it is possible to determine all related scenes in a video, even if elements of a scene are different. For example, if two cars are identified in a series of scenes but the rest of the elements change, such as in a car chase, then those scenes are correlated in a different way through the presence of the two fast-moving cars with the same drivers. Through this scene correlation, a scene database is developed to specify how the scenes are related to one another as well as to store all information about each object or area identified in each scene.

Figure 3:
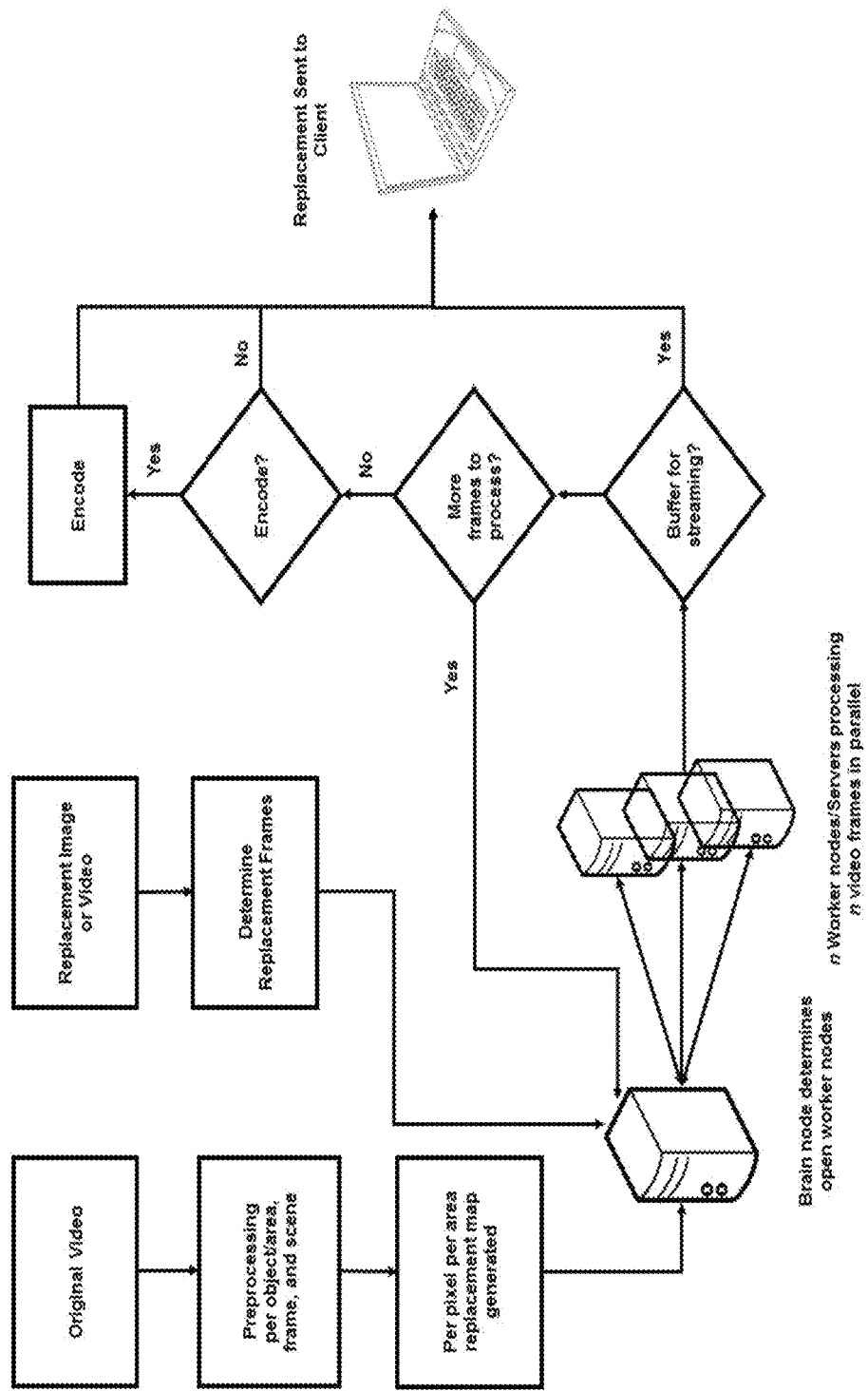
FIG. 3 illustrates a distributed computing architecture for fast replacement of elements in a video so that they can be buffered, streamed, encoded, or any combination thereof.

A scene processing server, as shown in FIG. 3, is used to intelligently pass scenes to scene worker nodes. These scenes can be processed in contiguous groupings so each can be sent to specific groupings of nodes for fast processing as the algorithms require n previous and m next sets of frame data to do their calculations.

Figure 4:
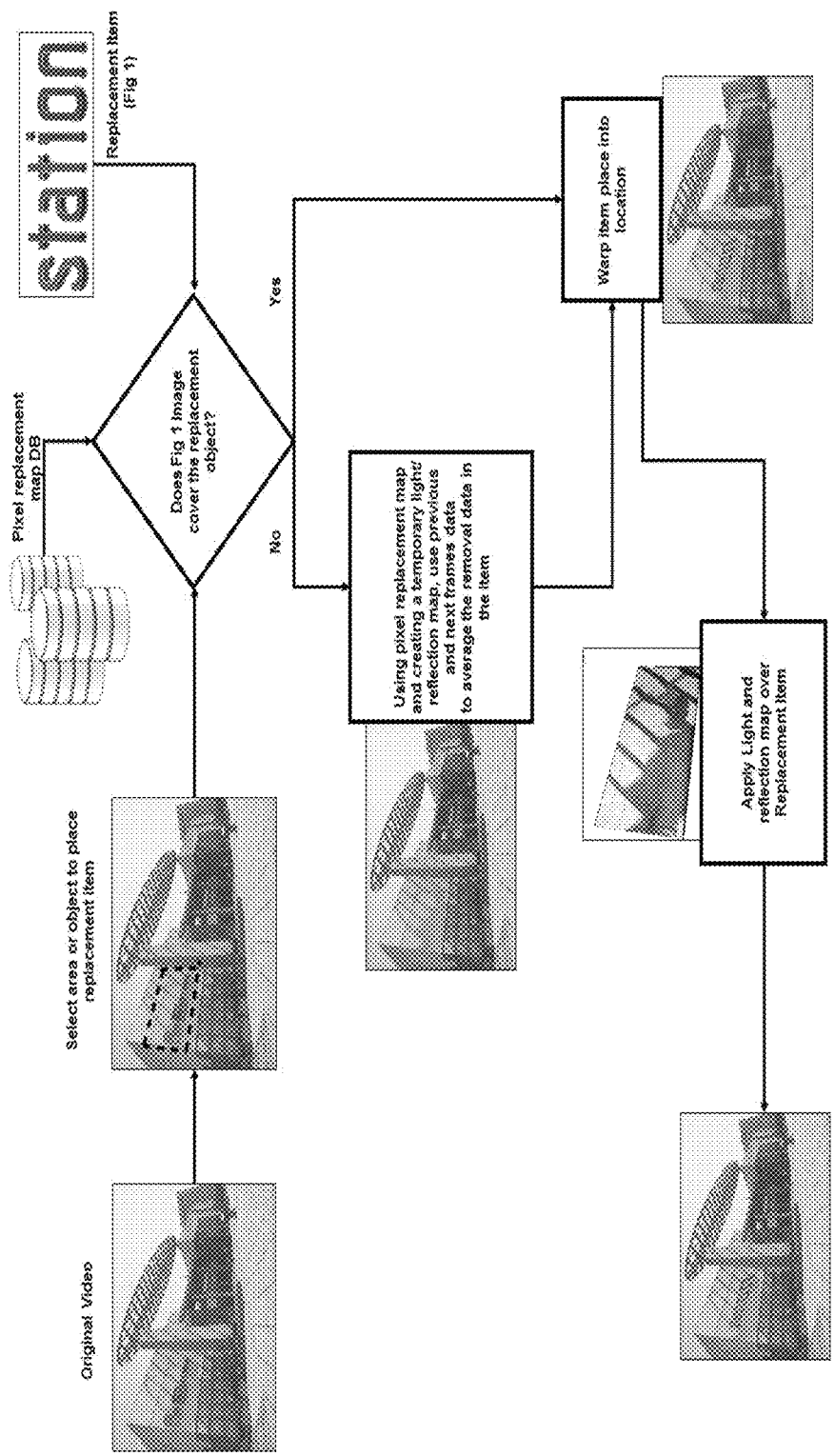
FIG. 4 illustrates the replacement of an element in a video frame.

In some embodiments of the present invention, a system and method for analyzing frames in a video are described. Individual frames from a video are analyzed through a frame preprocessing stage to automatically identify all objects and areas by comparing to a database of previously trained objects, areas, locations, actions, and other representations and by finding contiguous areas of space by examining like adjacent pixels. As illustrated in FIG. 4, the methods of analysis improve on existing methods by identifying/'understanding' and analyzing objects and areas within the video and comparing them with statistically good places for replacement depending on specific determining factors. In this way the invention can improve chances of having a good match for specific items that a user wants to place, replace, or remove.

Figure 5:
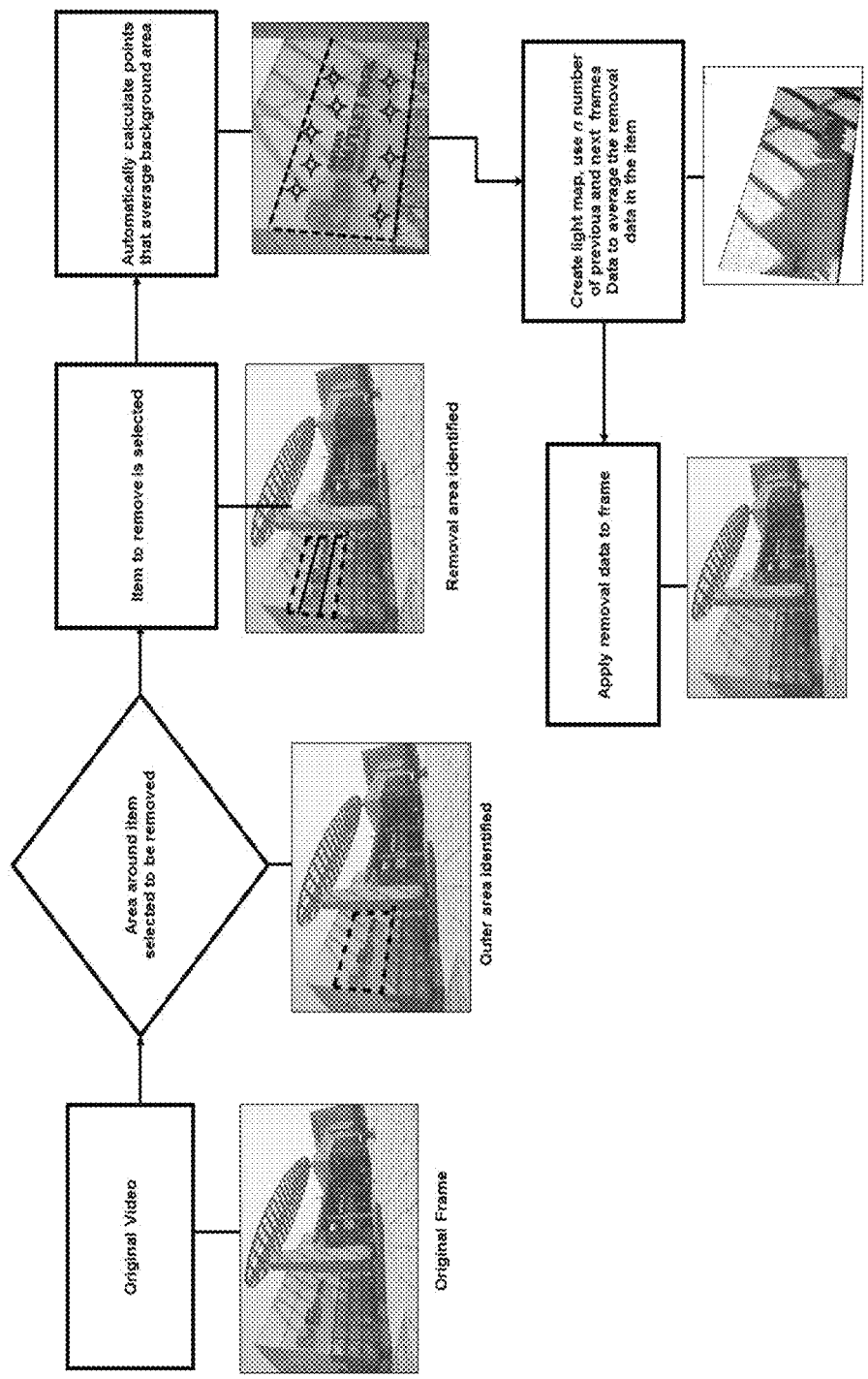
FIG. 5 illustrates the removal of an element in a video frame.

After identification, the associated characteristics of each object or area, such as lighting, shadows, warping, rotation, blurring, and occlusion can be determined in the overall frame, as shown in FIGS. 4 and 5. For instance, if a bottle is found in a frame, surrounding pixels can be examined to determine if a shadow or reflection is being cast, and this information can be used to help determine a light source. In another example, if a bottle is found in a frame, and there is an object occluding a portion of the bottle, the dimensions and positioning of the entire bottle can be calculated, and this information can be used to calculate what portion of the frame the bottle would occupy if the occluded object were not there. In this example, the invention can also examine pixels on the occluding object in order to determine if a shadow or reflection is being cast, and this information can also be used to help to determine things like light sources and deformation. In a third example, if the invention determines that the overall frame represents a football game in which there are two players on a field, and one player has something partially or mostly occluded in his or her hand, there is a significant likelihood that the player is holding a football, and then the invention can subsequently calculate what portion of the ball is showing as well as other characteristics such as shadows and deformation so that this information may be later used for altering, replacing or removing the object. Once the relationships between an object or area and its associated characteristics are established, each pixel that is a part of the resultant overall area can be used to calculate values such as color, luminosity, and hue. This can be used to create different types of maps that can then be associated with the object or area resulting in an overall object map. By storing all of this in an identification database, it can be retrieved later for a much faster 'understanding' of all objects and areas in a scene, and this information can be used to rapidly replace part of or the entire object or area as the adjustments to each individual pixel in the replacement area have been pre-calculated and requires a simple algorithm to create a difference mapping. The end result is that a perfectly blended, altered, replaced, or removed object or area is integrated naturally into the scene at playback.

Identification databases are a collection of datasets that identify specific objects, areas, actions such as playing a football game, locations such as cities, or environments such as a beach. The system uses multiple methods of collecting this data for comparison and later identification of specific objects, areas, actions, locations, and environments. The identification databases are broken into multiple specific subcategories of groupings of objects with tags associated with them for identification. The reduction of the databases or "datasets" into specific datasets allows said method to search n number of datasets on specific identification worker nodes very quickly (less than the time to create or render a frame). This allows the invention to process a single frame against n number of nodes each with their own set of datasets, allowing the invention to process millions of objects in the time it takes to process a single frame so that a video can be played back at near the speed of standard video buffering and playback.

Another aspect of the invention involves a tool for gathering and training image datasets of specific objects that can be used for identification both in the preprocessing phase and as well as the replacement or removal phase. By using image analysis and training algorithms such as, but not limited to, PICO, haar classifiers, and supervised learning, the tool can quickly collect and if necessary, crop, image data from either locally stored image sets or the internet by searching key tags of desired images. Once collected and cropped, the image data is converted into trained metadata files that can be placed onto server nodes and used to identify specific items or groupings of items on a per thread/node/server basis at a later time. In another embodiment, this gathering and training process may be done on local computers or can be split across networked servers for faster training. The tool allows for testing against multiple datasets to make sure that trained datasets are working properly before being stored in an identification database and deployed to servers.

Figure 6:
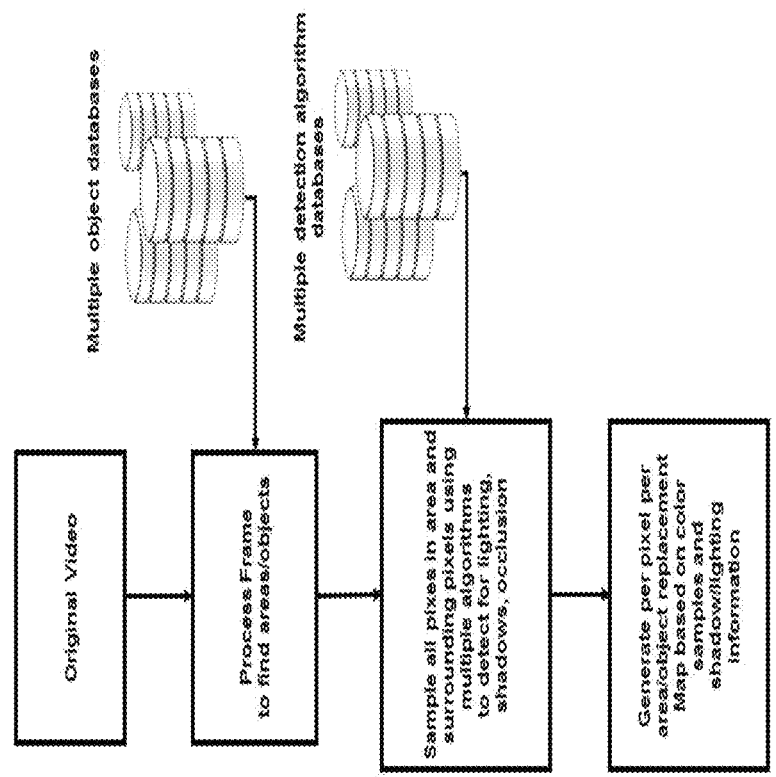
FIG. 6 illustrates the pixel replacement map associated with each object or area that is found in a scene or set of scenes.

Another aspect of the invention employs high speed detection of items within the video. This process which uses the methods from an identification database benefits the system by identifying information about the video that can help to identify the interests of the viewer. For example, the process can be used to detect human faces, logo, specific text, pornographic images, a violent scene, adult content, etc. As another example, the identified elements can be further customized by replacement, removal or other modifications. Using this user interest metadata, and combining it with other sets of information that define what a user is interested in, as shown in FIG. 6, the invention can more specifically target the replacement of objects and choose objects that are of higher interest to the specific viewer, increasing relevance to the viewer.

Another aspect of the invention involves creation of a 3d spatial map of each frame that consists of all of the objects, areas, light sources, shadows, and occluded objects that have been identified as well as the context of each frame. As the invention is able to identify objects, areas, locations, environments, and other important data required for a complete 'understanding' of a 3d scene, such as shadows, lighting, and occlusion, the invention can reconstruct all or a portion of a 3d environment by using such data.

Another aspect of the invention allows a user to select replacement zones to find a specific frame in the video where they believe a good place for a replacement is warranted. The algorithms search in all related scenes, as well as in previous and subsequent frames to do the replacement for the full area of video. Users can either select an area where they want to keep the replacement zone, or select a single point and allow the system to detect the extents of the replacement zone based on user's input/suggestion.

Another aspect of the invention involves high speed, distributed replacement of objects or areas in n number of frames. Once an object or area has been identified for replacement, alteration, or removal, and the object maps have been generated, which may or may not be prior to the completion of the entire video pre-processing, the system can identify n number of alteration worker nodes that can work on each individual frame in which the object has been identified as existing and for replacement, alteration, or removal, and each node can process for that particular object or area or a collective set of overlapping objects or areas. By doing this, the alteration process for m number of objects or areas can be near real-time.

Referring to FIG. 1, another aspect of the invention labeled "delivery method", allows for the option to pre-download the video with insertion of replacement items vs the dynamic replacement, building, delivery, and reconstruction of video. This option is preferable in cases where customized insertion is unnecessary and decreases server loads and cost. In a different embodiment, a video can be segmented into 1+number of replaceable element parts. By doing this, an entire video may not need to be re-encoded, it can retain n number of un-customized portions, and only need to encode the customized portion. In a different embodiment, the original video can be entirely maintained and all of the customized objects or areas can be customized in a separate set of frames that are entirely transparent other than the customized object or area. This separate set of frames can then either be composited onto the original set of frames, or be sent as a separate set of frames or a separate video that can be replayed at the same time as the original, un-customized video in a video player that can play multiple streams simultaneously.

In one embodiment, the method for processing a video in this invention is characterized by:
(i) Identifying one or more elements in each frame of said video;
(ii) Identifying one or more scenes from said video by comparing the elements in each frame with the elements in the previous frame and subsequent frame, wherein frames having common elements above a threshold number will be considered to be in the same scene;
iii) Obtaining one or more associated characteristics for each element in each frame;
iv) Generating a map on the 3D environment in each frame based on the associated characteristics in one or more previous frames and one or more subsequent frames; and
v) Modifying one or more scenes in said video based on said map.

In one embodiment, the method disclosed in this invention is further characterized in that the element in step (i) could be an object or a selected area in a scene of said video, with the one or more elements in step (i) identified by comparing with the characteristics stored in an object database and said element might automatically be detected by a detection algorithm which is stored in a detection algorithm database, or selected by user's input.

In one embodiment, the method disclosed in this invention further comprises the step (ii), in which the two or more said scenes are correlated by the elements in each of said scenes and stored in a scene database.

In one embodiment, the associated characteristics in step (iii) include, but are not limited to, position, dimension, reflection, lighting, shadows, warping, rotation, blurring and occlusion.

In one embodiment, the step (v) comprises modifying the one or more scenes by removing one or more elements and applying the map generated in the step (iv) to average the one or more removed elements in each frame within one or more scenes.

In one embodiment, the step (v) comprises modifying said one or more scenes by warping a desired element and applying the map generated in the step (iv) over the desired element in each frame within one or more scenes.

In one embodiment, the method disclosed in this invention further comprises delivering the modified video of step (v) by streaming or downloading.

In one embodiment, the computer implementation system for processing a video in this invention can be, but is not necessarily, characterized in that it comprises the steps below:
(i) Identifying one or more elements in each frame of said video;
(ii) Identifying one or more scenes from said video by comparing the elements in each frame with the elements in the previous frame and subsequent frame, wherein frames having common elements above a threshold number will be considered to be in the same scene;
iii) Obtaining one or more associated characteristics for each element in each frame;
iv) Generating a map on the 3D environment in each frame based on the associated characteristics in one or more previous frames and one or more subsequent frames; and
v) Modifying one or more scenes in said video based on said map.

In one embodiment, the computer implementation system disclosed in this invention is further characterized in that the element in step (i) can be an object or a selected area in a scene of said video, the one or more elements in step (i) can be identified by comparing with the characteristics stored in an object database; wherein said element might be automatically detected by a detection algorithm which is stored in a detection algorithm database, or selected by user's input.

In one embodiment, the method disclosed in this invention further comprises the step (ii), in which the two or more said scenes are correlated by the elements in each of said scenes and stored in a scene database.

In one embodiment, the associated characteristics in step (iii) include, but are not limited to, position, dimension, reflection, lighting, shadows, warping, rotation, blurring and occlusion.

In one embodiment, the step (v) could comprise modifying the one or more scenes by removing one or more elements and applying the map generated in the step (iv) to average the one or more removed elements in each frame within one or more scenes.

In one embodiment, the step (v) could comprise modifying said one or more scenes by warping a desired element and applying the map generated in the step (iv) over the desired element in each frame within one or more scenes.

In one embodiment, the computer implementation system disclosed in this invention could further comprise delivering the modified video of step (v) by streaming or downloading.

What is claimed is:

1. A computer implemented method for modifying a video, the method comprising:
   1) Identifying, on a processor, one or more elements in selected frames of a video by comparing with characteristics stored in a database;
   2) Constructing one or more 3D spatial maps related to said one or more elements; and
   3) By applying said one or more 3D spatial maps, modifying said one or more elements in one or more of said selected frames, thus modifying said video.

2. The method of claim 1, wherein said one or more 3D spatial maps are generated for all elements in a 3D environment, some of which are based on said characteristics.

3. The method of claim 1, wherein said characteristics comprise position, dimension, reflection, lighting, shadows, warping, rotation, blurring and occlusion in a 3D environment.

4. The method of claim 1, wherein said one or more 3D spatial maps construct all or a portion of a 3D environment.

5. The method of claim 1, wherein said database comprises one or more element-identification algorithms.

6. The method of claim 1, wherein said one or more elements are objects, regions, or part thereof in all frames.

7. The method of claim 1, further comprising detecting a zone suitable for modification on said processor.

8. The method of claim 7, wherein said zone for modification is detected by a detection algorithm which is stored in a detection algorithm database or selected in view of an input from a user.

9. The method of claim 7, wherein said zone is modified by:
   a) removing one or more selected elements from said zone in some or all frames containing said one or more selected elements in said one or more scenes and adjusting said zone without said one or more selected elements in all frames being modified by applying said one or more 3D spatial maps;
   b) removing one or more selected elements from some or all frames containing said one or more selected elements, applying a new element to said zone in said one or more scenes and adjusting said zone with said new elements in all frames being modified by applying said one or more 3D spatial maps; or
   c) warping a desired element therein in some or all frames containing said desired element in said one or more scenes and adjusting said zone with said warped element in all frames being modified by applying said one or more 3D spatial maps.

10. The method of claim 1, wherein said video is modified in a real-time manner or near real-time manner.

11. A computer implemented method for modifying a video, the method comprising:
    1) Accepting from a user the locations of one or more replacement zones in one or more frames of said video,
    2) Constructing one or more 3D spatial maps related to said one or more replacement zones,
    3) Identifying, on a processor, one or more frames of said video that contain said one or more replacement zones, and
    4) By applying said one or more 3D spatial maps, modifying said one or more replacement zones in one or more of said selected frames, thus modifying said video.

12. The method of claim 11, wherein said one or more 3D spatial maps are generated for all elements in a 3D environment, some of which are based on said characteristics.

13. The method of claim 11, wherein said characteristics comprise position, dimension, reflection, lighting, shadows, warping, rotation, blurring and occlusion in a 3D environment.

14. The method of claim 11, wherein said one or more 3D spatial maps construct all or a portion of a 3D environment.

15. The method of claim 11, wherein said database comprises one or more element-identification algorithms.

16. The method of claim 11, wherein said one or more elements are objects, regions, or part thereof in all frames.

17. The method of claim 11, further comprising detecting a zone suitable for modification on said processor.

18. The method of claim 17, wherein said zone for modification is detected by a detection algorithm which is stored in a detection algorithm database or selected in view of an input from a user.

19. The method of claim 17, wherein said zone is modified by:
 a) removing one or more selected elements from said zone in some or all frames containing said one or more selected elements in said one or more scenes and adjusting said zone without said one or more selected elements in all frames being modified by applying said one or more 3D spatial maps;
 b) removing one or more selected elements from some or all frames containing said one or more selected elements, applying a new element to said zone in said one or more scenes and adjusting said zone with said new elements in all frames being modified by applying said one or more 3D spatial maps; or
 c) warping a desired element therein in some or all frames containing said desired element in said one or more scenes and adjusting said zone with said warped element in all frames being modified by applying said one or more 3D spatial maps.

20. The method of claim 11, wherein said video is modified in a real-time manner or near real-time manner.

* * * * *